(12) United States Patent
Lastinger et al.

(10) Patent No.: US 7,489,282 B2
(45) Date of Patent: Feb. 10, 2009

(54) METHOD AND APPARATUS FOR AN ANTENNA MODULE

(75) Inventors: Roc Lastinger, Cave Creek, AZ (US); John Spenik, Phoenix, AZ (US); Brian C Woodbury, Gilbert, AZ (US)

(73) Assignee: Rotani, Inc., Scottsdale, AZ (US)

( * ) Notice: Subject to any disclaimer, the term of this patent is extended or adjusted under 35 U.S.C. 154(b) by 392 days.

(21) Appl. No.: 11/275,619

(22) Filed: Jan. 19, 2006

(65) Prior Publication Data

US 2006/0164320 A1 Jul. 27, 2006

Related U.S. Application Data

(60) Provisional application No. 60/646,024, filed on Jan. 21, 2005, provisional application No. 60/674,568, filed on Apr. 25, 2005.

(51) Int. Cl.
*H01Q 1/52* (2006.01)

(52) U.S. Cl. .................. 343/841; 343/844; 343/849; 343/851

(58) Field of Classification Search ............... 343/841, 343/851, 844

See application file for complete search history.

(56) References Cited

U.S. PATENT DOCUMENTS

| | | | |
|---|---|---|---|
| 3,803,625 A | 4/1974 | Nemit | |
| 4,128,740 A | 12/1978 | Graziano | |
| 5,113,525 A | 5/1992 | Andoh | |
| 5,265,263 A | 11/1993 | Ramsdale et al. | |
| 5,276,907 A | 1/1994 | Meidan | |
| 5,307,507 A | 4/1994 | Kanai | |
| 5,365,571 A | 11/1994 | Rha et al. | |
| 5,491,833 A | 2/1996 | Hamabe | |
| 5,548,813 A | 8/1996 | Charas et al. | |
| 5,603,082 A | 2/1997 | Hamabe | |
| 5,606,727 A | 2/1997 | Ueda | |
| 5,613,200 A | 3/1997 | Hamabe | |
| 5,649,292 A | 7/1997 | Doner | |
| 5,684,491 A | 11/1997 | Lopez et al. | |
| 5,740,536 A | 4/1998 | Benveniste | |
| 5,771,449 A | 6/1998 | Blasing et al. | |
| 5,835,859 A | 11/1998 | Doner | |
| 5,901,356 A | 5/1999 | Hudson | |

(Continued)

FOREIGN PATENT DOCUMENTS

EP 0022991 10/1980

(Continued)

OTHER PUBLICATIONS

Johnson, Richard C., Antenna Engineering Handbook.,, pp. 27-8-27-10, Publisher: McGraw-Hill.

(Continued)

*Primary Examiner*—Trinh V Dinh
(74) *Attorney, Agent, or Firm*—Letham Law Firm LLC; Lawrence Letham

(57) ABSTRACT

An antenna module comprising at least two antennas in substantial close proximity and a shield configured to reduce interference between the antennas and/or to shape the antenna coverage areas is disclosed. A substantially triangular shield with antennas positioned at each of the vertices may shape the antenna coverage areas to form virtual sectors.

28 Claims, 11 Drawing Sheets

U.S. PATENT DOCUMENTS

| | | | |
|---|---|---|---|
| 5,960,349 | A | 9/1999 | Chheda et al. |
| 6,055,230 | A | 4/2000 | Feuerstein et al. |
| 6,104,935 | A | 8/2000 | Smith et al. |
| 6,118,767 | A | 9/2000 | Shen et al. |
| 6,128,497 | A | 10/2000 | Faruque |
| 6,154,654 | A | 11/2000 | Mao |
| 6,178,328 | B1 | 1/2001 | Tang et al. |
| 6,229,486 | B1 | 5/2001 | Krile |
| 6,272,337 | B1 | 8/2001 | Mount et al. |
| 6,278,723 | B1 | 8/2001 | Meihofer et al. |
| 6,304,762 | B1 | 10/2001 | Myers et al. |
| 6,360,107 | B1 | 3/2002 | Lin et al. |
| 6,400,697 | B1 | 6/2002 | Leung et al. |
| 6,400,704 | B2 | 6/2002 | Mikuni et al. |
| 6,400,955 | B1 | 6/2002 | Kawabata et al. |
| 6,405,043 | B1 | 6/2002 | Jensen et al. |
| 6,405,058 | B2 | 6/2002 | Bobier |
| 6,418,316 | B2 | 7/2002 | Hildebrand et al. |
| 6,421,542 | B1 | 7/2002 | Sandler et al. |
| 6,463,301 | B1 | 10/2002 | Bevan et al. |
| 6,470,195 | B1 | 10/2002 | Meyer |
| 6,480,558 | B1 | 11/2002 | Ottosson et al. |
| 6,486,832 | B1 | 11/2002 | Abramov |
| 6,487,414 | B1 | 11/2002 | Tanay et al. |
| 6,497,599 | B1 | 12/2002 | Johnson et al. |
| 6,505,045 | B1 | 1/2003 | Hills |
| 6,522,885 | B1 | 2/2003 | Tang et al. |
| 6,531,985 | B1 | 3/2003 | Jones |
| 6,542,485 | B1 | 4/2003 | Mujtaba |
| 6,560,443 | B1 | 5/2003 | Vaisanen |
| 6,615,047 | B1 | 9/2003 | Yasooka et al. |
| 6,654,612 | B1 | 11/2003 | Avidor et al. |
| 6,690,657 | B1 | 2/2004 | Lau |
| 6,708,036 | B2 | 3/2004 | Proctor et al. |
| 6,741,837 | B1 | 5/2004 | Nakano et al. |
| 6,748,218 | B1 | 6/2004 | Johnson et al. |
| 6,795,409 | B1 | 9/2004 | Youssefmir et al. |
| 6,898,431 | B1 | 5/2005 | Peele |
| 6,914,577 | B2 * | 7/2005 | McCandless ............... 343/841 |
| 7,010,015 | B2 | 3/2006 | Hervey, Jr. et al. |
| 7,069,009 | B2 | 6/2006 | Li et al. |
| 7,194,017 | B2 | 3/2007 | Hervey, Jr. et al. |
| 7,202,824 | B1 * | 4/2007 | Sanelli et al. ............... 343/702 |
| 7,280,829 | B2 | 10/2007 | Hervey, Jr. et al. |
| 7,348,930 | B2 * | 3/2008 | Lastinger et al. ............ 343/844 |
| 2001/0046866 | A1 | 11/2001 | Wang |
| 2002/0019233 | A1 | 2/2002 | Leung |
| 2002/0077152 | A1 | 6/2002 | Johnson et al. |
| 2002/0197984 | A1 | 12/2002 | Monin et al. |
| 2003/0002442 | A1 | 1/2003 | Flammer, III |
| 2003/0087645 | A1 | 5/2003 | Kim |
| 2003/0109285 | A1 | 6/2003 | Reed |
| 2003/0125089 | A1 | 7/2003 | Pedersen |
| 2003/0181180 | A1 | 9/2003 | Darabi |
| 2003/0184490 | A1 | 10/2003 | Raiman et al. |
| 2003/0210665 | A1 | 11/2003 | Salmenkaita et al. |
| 2004/0009791 | A1 | 1/2004 | Hiramatsu |
| 2004/0106412 | A1 | 6/2004 | Laroia et al. |
| 2004/0174303 | A1 * | 9/2004 | Duxbury et al. ....... 343/700 MS |
| 2004/0196834 | A1 | 10/2004 | Ofek et al. |
| 2005/0037766 | A1 | 2/2005 | Hans et al. |
| 2005/0272432 | A1 | 12/2005 | Ji et al. |
| 2006/0104334 | A1 | 5/2006 | Hervey, Jr. et al. |
| 2006/0148484 | A1 | 7/2006 | Zhang et al. |
| 2007/0297371 | A1 | 12/2007 | Lea |

FOREIGN PATENT DOCUMENTS

| | | |
|---|---|---|
| EP | 0/668/627 | 8/1995 |
| EP | 0435283 | 12/1995 |
| EP | 0/715/478 | 6/1996 |
| EP | 0715478 | 6/1996 |
| EP | 0/895/436 | 2/1999 |
| EP | 0895436 | 2/1999 |
| EP | 0/980/111 | 2/2000 |
| EP | 0622925 | 4/2001 |
| EP | 0660631 | 8/2002 |
| EP | 0983705 | 4/2004 |
| EP | 1014740 | 7/2006 |
| EP | 0785695 | 9/2006 |
| EP | 0782361 | 6/2007 |
| EP | 1189467 | 3/2008 |
| JP | 57020002 | 2/1982 |
| JP | 2000 031721 | 1/2000 |
| KR | 20-0235289 | 10/2001 |
| WO | WO 98/42150 | 9/1998 |
| WO | WO 9842150 | 9/1998 |
| WO | WO 99/52311 | 10/1999 |
| WO | WO 9952311 | 10/1999 |
| WO | WO 01/01582 | 1/2001 |
| WO | WO 02/073739 | 9/2002 |
| WO | WO 03/043128 | 5/2003 |

OTHER PUBLICATIONS

Mishima, H et al., Base Station Antenna and Multiplexer for 800 MHz Band Land Mobile Telephone System, Review of the Electrical Communication Laboratories, Nov. 1977, pp. 1255-1269, vol. 25, No. 11/12, Publisher: Musashino Electrical Communications Laboratory.

* cited by examiner

METHOD AND APPARATUS FOR AN ANTENNA MODULE

CROSS-REFERENCE TO RELATED APPLICATIONS

This application claims priority to, and the benefit of, U.S. provisional application Ser. No. 60/646,024 filed on Jan. 21, 2005 and U.S. provisional application Ser. No. 60/674,568 filed on Apr. 25, 2005, both of which are hereby incorporated by reference in their entirety.

BACKGROUND OF THE INVENTION

1. Field of the Invention

This invention relates generally to wireless communications, and more particularly, to antenna modules for wireless communication.

2. Description of Related Art

Antennas find uses in a variety of wireless communication applications, such as cell phones, television, radio, and access points for computers. Devices that use antennas for wireless communication may benefit from an antenna module that reduces interference between antennas in substantial close proximity and that provides shaped antenna coverage areas.

BRIEF SUMMARY OF THE INVENTION

Methods and apparatus according to various exemplary embodiments of the present invention comprise at least two antennas in substantial close proximity and a shield configured to reduce interference between the antennas and/or to shape the antenna coverage areas. In one embodiment, a substantially triangular shield with antennas positioned at each of the vertices shapes the antenna coverage areas to form virtual sectors

BRIEF DESCRIPTION OF THE DRAWINGS

A more complete understanding of the present invention may be derived by referring to the detailed description and claims when considered in connection with the figures, wherein like reference numbers refer to similar elements throughout the figures, and:

DETAILED DESCRIPTION OF EXEMPLARY EMBODIMENTS

Figure 1:
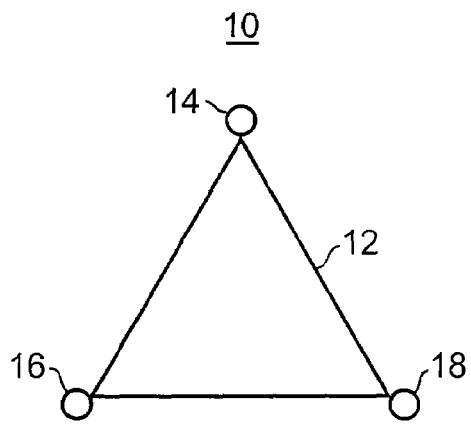
FIG. 1 is a diagram of a top view of a triangular antenna module in accordance with one embodiment of the present invention.

The accompanying drawings show exemplary embodiments by way of illustration and best mode. While these exemplary embodiments are described, other embodiments may be realized and changes may be made without departing from the spirit and scope of the invention. Thus, the detailed description is presented for purposes of illustration only and not of limitation. For example, the steps recited in any of the method or process descriptions may be executed in any suitable order and are not limited to the order presented.

This application incorporates by reference U.S. utility application Ser. No. 10/869,201 filed on Jun. 15, 2004, and U.S. utility application Ser. No. 10/880,387 filed on Jun. 29, 2004 in their entirety for the teachings taught therein. Moreover, for the sake of brevity, conventional data networking,. wireless technology, antenna operation, electronic capabilities, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. The present invention may be embodied as a customization of an existing system, an add-on product, or a distributed system.

The present invention is described partly in terms of functional components and various methods. Such functional components may be realized by any number of components configured to perform the specified functions and achieve the various results. For example, the present invention may employ various types of antennas, such as, directional, omni-directional, high Q, low Q, patch, quadrifilar helix, adaptive array, MIMO (Multiple-Input-Multiple-Output), beam-forming, and any other type of antenna suitable for the environment or application. Shields may be made of any material suitable for the environment, the antenna type, and the application. For example, a shield may be made of aluminum, steel, copper, plastic, plastic coated with a metallic layer, foam, metal mesh, and any other suitable material and/or combination of materials. Shields may substantially and/or partially absorb and/or reflect radio waves. Shields may have any shape suitable to reduce interference and/or to produce a desired coverage area pattern. For example, shields may be triangular, triangular with concave cavities, triangular with extended vertices, parabolic, hexagonal, substantially similar to an I-beam, and any other shape suitable for the environment or application. Antennas may be placed anywhere on the shield and may be attached to the shield in any suitable manner. Antenna spacers may be used to connect the antennas to the shield. Antenna spacers may be of any material, size, and shape. Antennas may interface with the device using the antenna in any suitable manner.

In addition, the present invention may be practiced in conjunction with any number of applications and environments, and the systems described are merely exemplary applications of the invention. Further, the present invention may employ any number of conventional or custom techniques for manufacture, testing, connecting, mounting, and communicating with wireless devices.

Methods and apparatus according to various exemplary embodiments of the present invention comprise at least two antennas and a shield. The shield may reduce the near-field interference between antennas in substantial close proximity; reduce coupling between antennas in substantial close proximity; shield the antennas from noise generated by system electronics, interference from other system, radios, and/or external noise sources; and shape the coverage area of each of the antennas. The effects of near-field interference and detuning may be reduced by antenna position on the shield, the type of antenna, antenna orientation, the quality of antenna, the types of materials selected for the shield, and antenna spacers. Sources of near-field interference may include, for example, the near field generated by other antennas in substantial close proximity. The shape of the shield and antenna spacers may affect the shape of each antenna's coverage area and how the individual antenna coverage areas overlap. Overlapping coverage areas from different antennas form virtual sectors. Limiting the overlap of one antenna's coverage area over another antenna's coverage area may reduce interference.

Figure 2:
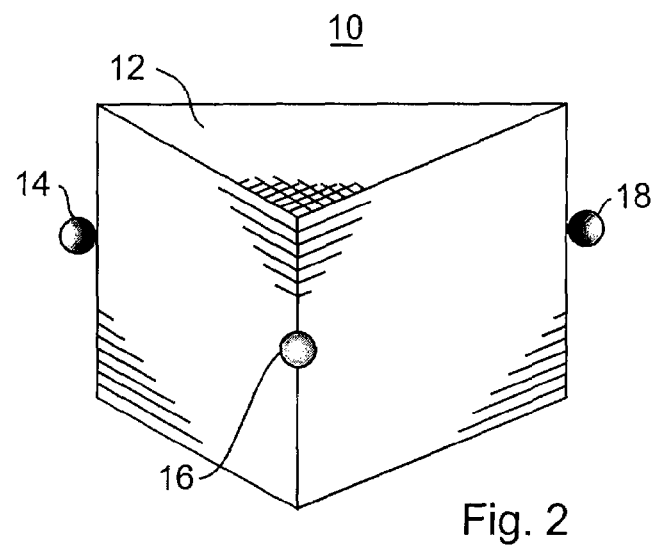
FIG. 2 is a diagram of a perspective view of a triangular antenna module in accordance with one embodiment of the present invention.
Figure 3:
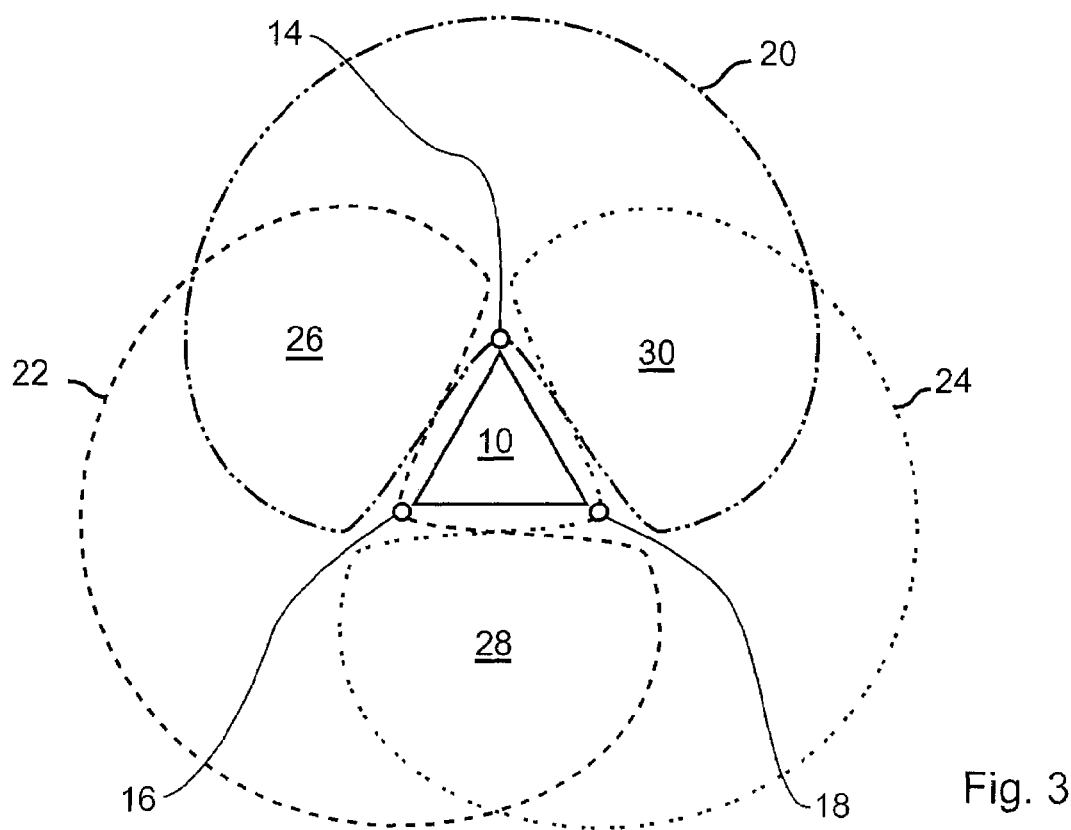
FIG. 3 is a diagram of a top view of coverage areas of a triangular antenna module in accordance with one embodiment of the present invention.

In particular, referring to FIGS. 1-3, an antenna module 10, in accordance with one embodiment of the invention, comprises three omni-directional antennas 14, 16, and 18 and a shield 12. The shield 12, from the top view referring to FIG. 1, is substantially triangular in shape. Each antenna 14, 16, and 18 is placed substantially at one of the triangle vertices. The size of the shield 12, and therefore the distance between antennas, may be such that the near-field interference between the antennas 14, 16, 18 is reduced. The shape of the shield and the offset of each antenna relative to the shield may form coverage areas 20, 22, and 24 for antennas 14, 16, and 18, respectively, such that the coverage area from any antenna does not substantially interfere with any other antenna.

The antennas may be of any type and/or configuration. The term antenna is not limited to a single antenna element, but may be a collection and/or array of antennas elements designed to operate in a coordinate manner. Arrays of antennas may use electronic circuits that may process the signals coming from each antenna element to form a signal that may be similar to the signal from an antenna that has a single antenna element. The present invention may employ various types of array antennas, for example, adaptive array, MIMO, and other antennas having multiple antenna elements. For example, in one embodiment, referring to FIG. 4, antenna 16 may be an antenna with at least two antenna elements such as an array antenna. The antenna elements of antenna 16 may interface with a single radio. In another embodiment, referring to FIG. 4, antennas 14, 16, and 18 may each have a single antenna element, but they may each interface to a single radio and may collectively operate as a MIMO antenna. In another embodiment, referring to FIG. 2, antenna 16 is a MIMO antenna comprising three separate antenna elements. Each antenna element of the MIMO antenna 16 may be placed on the forward edge of the same triangle vertex. Each antenna element may be spaced along the vertex edge at an appropriate distance for each antenna element to operate in a suitable manner. In another embodiment, referring to FIG. 4, the antenna elements of MIMO antenna 16 may be spaced along the edge of the triangular shield 12. Use of arrays of antenna elements, as opposed to antennas with a single antenna element, may require shields of larger dimensions to accommodate the antenna elements in an operational manner. A shield, as discussed below, may be used to shape the coverage area of an antenna, whether the antenna has a single antenna element or multiple antenna elements. Antennas with multiple antenna elements may provide additional control over the antenna coverage area in addition to the shield. For example, a beam forming antenna array may be used in conjunction with a shield.

Additionally, different antenna types may be used at each position on a shield. For example, referring to FIG. 6, antenna 14 is an omni-directional antenna that has a single antenna element, antenna 16 is an adaptive array composed of multiple antenna elements, and antenna 18 is a directional antenna that has a single antenna element. Any combination of antenna types may be used in conjunction with a shield. Additionally, each antenna may operate at a frequency that may be different from the frequency used by the other antennas. Furthermore, the communication protocol and/or channel used by each antenna may be different. In one embodiment, referring to FIG. 6, antennas 14, 16, and 18 each use the same communication protocol, but use the different channels provided by the protocol.

Associated with each antenna is a coverage area. The coverage area is the area in which the antenna may receive a transmitted signal or transmit a signal with strength sufficient to be received by another device. In the absence of interference, the shape of the coverage area depends on the type of antenna. For example, the coverage area of an omni-directional antenna is substantially spherical. The coverage area of a directional antenna is substantially a fraction of a sphere. The shield may alter the shape of the coverage area. In one embodiment, referring to FIG. 3, antenna 14 is an omni-directional antenna. In the absence of interference and before antenna 14 is placed proximate to shield 12, the coverage area of antenna 14, in two-dimensions, is substantially circular. Placing antenna 14 in proximity with shield 12, decreases the coverage area of antenna 14 from being substantially circular to covering approximately 270 degrees as shown by coverage area 20. In three dimensions, coverage area 20 is represented as a sphere with a wedge removed. A shield may also limit the coverage area of a directional antenna. In another embodiment, referring to FIGS. 8-10, antennas 14, 16, and 18 are directional antennas with a coverage area of approximately 240 degrees. Placing antennas 14, 16, and 18 in parabolic shield 40 limits the antenna coverage areas to approximately 180 degrees with side lobes, as shown in FIG. 10.

Figure 28:
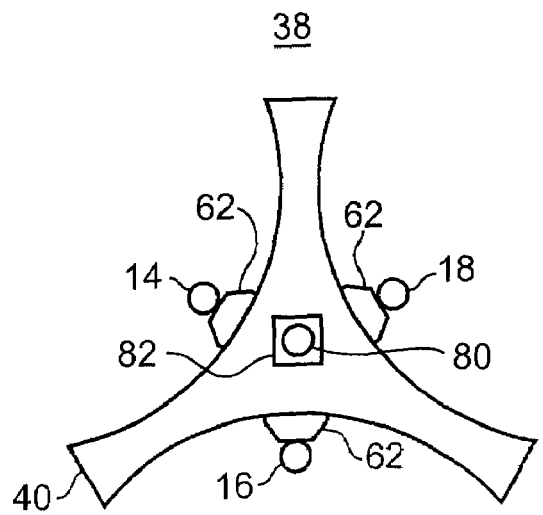
FIG. 28 is a diagram of a top view of an extended triangular antenna module with antenna spacers and top mounted omni-directional antenna in accordance with one embodiment of the present invention.
Figure 29:
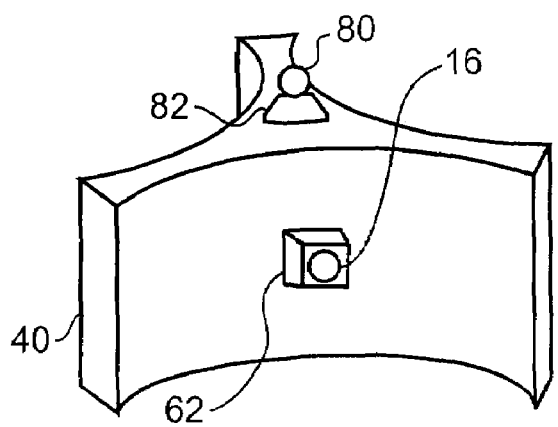
FIG. 29 is a diagram of a perspective view of an extended triangular antenna module with antenna spacers and top mounted omni-directional antenna in accordance with one embodiment of the present invention.
Figure 30:
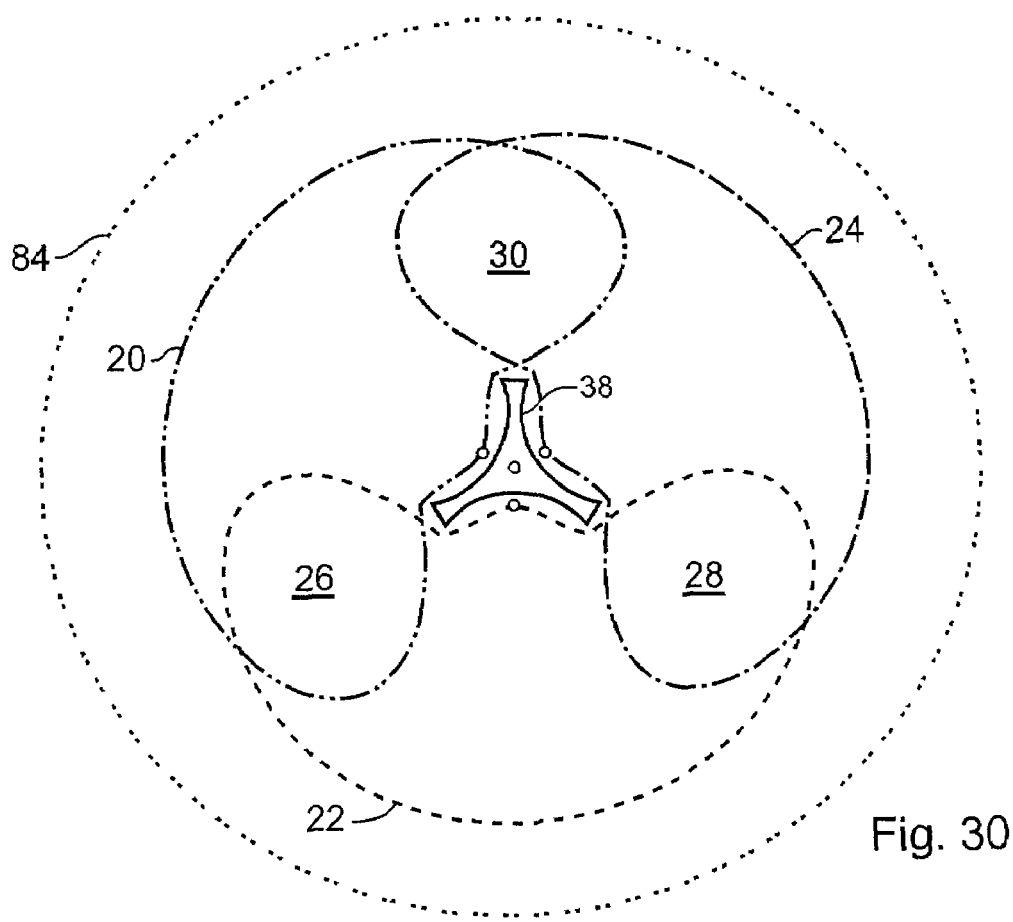
FIG. 30 is a diagram of a top view of coverage areas of an extended triangular antenna module with antenna spacers and top mounted omni-directional antenna in accordance with one embodiment of the present invention.

The overlap of two coverage areas from different antennas forms virtual sectors. Referring to FIGS. 3, 5, 7, 10,13, 23, and 30, the overlap of coverage areas 20 and 22 form virtual sector 26, the overlap of coverage areas 22 and 24 form virtual sector 28, and the overlap of coverage areas 24 and 20 form virtual sector 30. Virtual sectors are not limited to the overlap of two substantially adjacent coverage areas. In one embodiment, referring to FIGS. 28-30, antenna spacer 82 and antenna 80 are placed on top of shield 40 in addition to antennas 14, 16 and 18. In this embodiment, antenna 80 is an omni-directional antenna whose area of coverage is represented in two-dimensions by circle 84. Virtual sectors 26, 28, and 30 still exist; however, the overlap of coverage area 84 with coverage areas 20, 22, and 24 also form virtual sectors that are substantially the size of areas of coverage 20, 22, and 24. Clients in coverage area 20 may be serviced by either antenna 14 and/or antenna 80, clients in coverage area 22 may be serviced by antenna 16 and/or antenna 80, and so forth. Additionally, clients in virtual sector 26 may be serviced by antennas 14, 16, and/or 80. Antenna 80 serves any desired purpose or performs any type of communication task. In one embodiment, antenna 80 services clients. In another embodiment, antenna 80 communicates with, for example, other antenna modules, substantially adjacent wireless cells, and wireless cells that form a wireless mesh network. In another embodiment, antenna 80 does not transmit signals, but is used solely to detect possible noise sources or other sources of interference.

Virtual sectors may represent areas of high interference or where wireless devices may be serviced by more than one antenna. For example, referring to FIGS. 1-3, suppose that antenna module 10 supports the I.E.E.E. 802.11a/b/g wireless communication protocols. On one hand, setting the radios attached to antennas 14 and 16 to operate on the same channel may result in high levels of interference in virtual sector 26. Transmissions from antenna 14 may interfere in the operation of antenna 16 and visa versa. On the other hand, setting the radios attached to antennas 14 and 16 to different, minimally interfering channels, may allow a wireless client located in virtual sector 26 to communicate with either antenna 14 on one channel and/or antenna 16 on a different channel. In an exemplary embodiment, referring to FIGS. 1-3, antennas 14, 16, and 18 each operate on a different, minimally interfering channel.

When antennas 14,16, and 18 operate simultaneously, shields 12, 36, 40, and 44 of FIGS. 4, 6, 8, and 11, respectively, reduce antenna coupling and/or near-field interference between antennas, thereby permitting the antennas to be placed in closer proximity to each other than if a shield were not used. Shield 12 with antenna placement as shown in FIG. 1 may be less effective at reducing antenna coupling and/or near-field interference between antennas 14,16, and 18 because the shield provides less isolation between the antennas.

Figure 18:
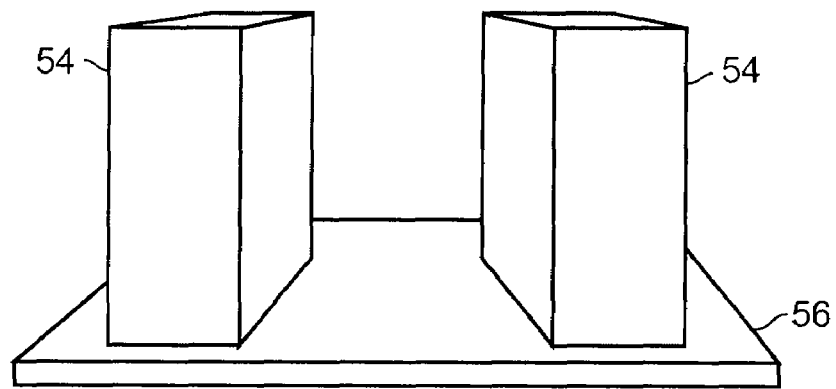
FIG. 18 is a diagram of a perspective view of antenna covers with mounting base in accordance with one embodiment of the present invention.

Antennas and/or antenna modules may also be placed under a protective cover. Referring to FIG. 18, antenna cover 54 may be formed of any material that does not substantially interfere with antenna operation, for example, foam, plastic, cloth, glass, and any other suitable material. The antenna cover 54 may be used with any antenna type and/or antenna module. The antenna cover 54 may serve secondary functions such as, for example, facilitating mounting of the antenna and/or antenna module. The antenna covers 54 may be fastened to a mounting base 56 to form an antenna module that may be use in a variety of circumstances. The mounting base 56 may be used to mount the antennas and/or antenna modules in addition to the antenna covers 54.

Figure 25:
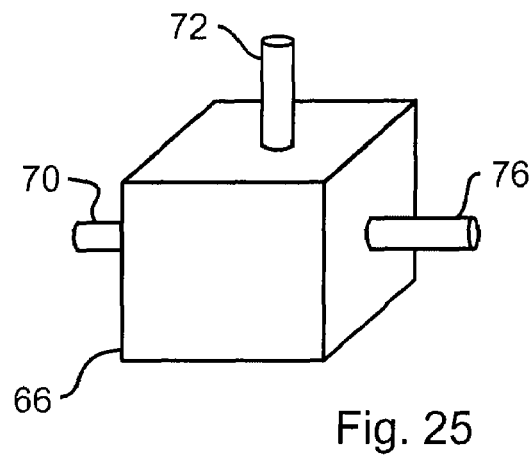
FIG. 25 is a diagram of a perspective view of a cubical antenna module with three antenna elements configured to operate as a MIMO antenna in accordance with one embodiment of the present invention.

With respect to multiple antenna elements which form MIMO (Multiple-Input-Multiple-Output) antennas, in general, a MIMO antenna is comprised of at least two antenna elements that interface with the same radio and function in a coordinated manner. As described above, referring to FIG. 4, antennas 14, 16, and 18 may each have a single antenna element, but they may interface together and function in a coordinated manner to form a MIMO antenna. The individual antennas that comprise a MIMO antenna may be of any type, for example, omni-directional, directional, patch, whip, helical, and yagi. The antennas that comprise the MIMO antenna may operate as transmit only, receive only, or transmit/receive antennas. Any combination of transmit only, receive only, and transmit/receive antennas may be used to form a MIMO antenna. In an exemplary embodiment, referring to FIG. 4, antennas 14 and 18 transmit and receive, while antenna 16 receives only. In another embodiment, referring to FIG. 25, antennas 70 and 76 transmit and receive while antenna 72 receives only. The signals received through and transmitted from antennas 14, 16, and 18 may be used in any manner, singly or in combination, to improve reception and/or transmission in a coverage area.

Figure 24:
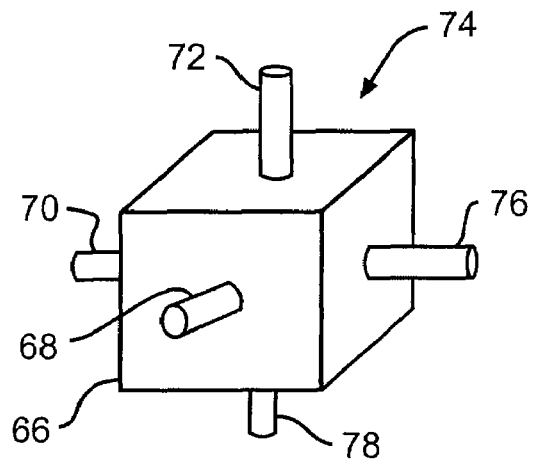
FIG. 24 is a diagram of a perspective view of a cubical antenna module with six antenna elements configured to operate as MIMO (Multiple-Input-Multiple-Output) antennas in accordance with one embodiment of the present invention.

A shield may support any number of MIMO antennas. For example, referring to FIG. 25, in a situation where antennas 70, 72, and 76 each have a single antenna element, any two antennas may form a MIMO antenna. In an exemplary embodiment, antennas 70 and 72 form a MIMO antenna that interfaces to a first radio while antenna 76 interfaces to a second radio. In another embodiment, antennas 72 and 76 form a MIMO antenna that interfaces to a first radio while antenna 70 interfaces to a second radio. In a third embodiment, antennas 70, 72, and 76 form a MIMO antenna and interface with the same radio. Increasing the number of single element antennas associated with a shield increases the number of possible combinations for forming MIMO antennas. For example, referring to FIG. 24, any two antennas selected from the group of antennas 68, 70, 72, 74, 76, and 78 may operate as a MIMO antenna and interface to a radio. In one embodiment, antennas 68 and 76 operate as a MIMO antenna and interface to a first radio. Antenna pairs 70, 78 and 72, 74 also operate as MIMO antennas and each pair interface with a second and third radio, respectively. This embodiment pairs antennas that are positioned orthogonally to each other.

Figure 26:
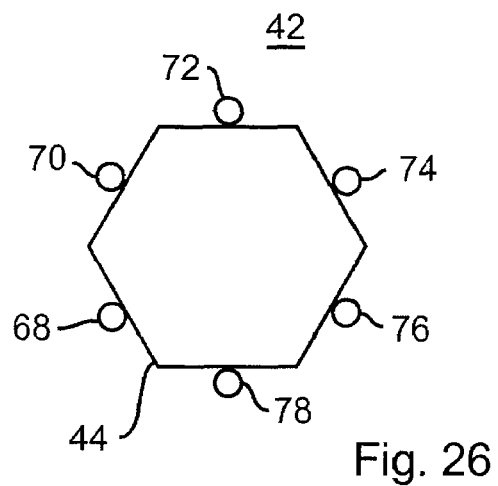
FIG. 26 is a diagram of a top view of a hexagonal antenna module with six antenna elements configured to operate as MIMO antennas in accordance with one embodiment of the present invention.
Figure 27:
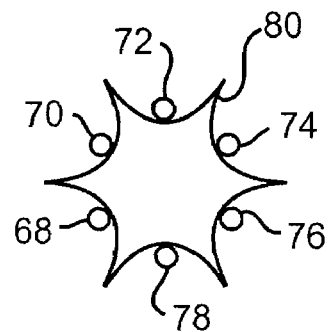
FIG. 27 is a diagram of a top view of a parabolic antenna module with six antenna elements configured to operate as MIMO antennas in accordance with one embodiment of the present invention.

In another embodiment, referring to FIGS. 26-27, any two antennas may be used to form a MIMO antenna. In one embodiment, referring to FIG. 24, antenna pairs 68 and 70, 72 and 74, 76 and 78 each form MIMO antennas and interface to a first, second and third radio respectively. In another embodiment, the antenna pairs 68 and 74, 70 and 76, 72 and 78 form MIMO antennas. More than two antennas may operate together to form a MIMO antennas. In an exemplary embodiment, referring to FIG. 24, antennas 68, 72, and 76 operate as one MIMO antenna while antennas 70, 72 and 74 operate as another MIMO antenna. In this embodiment, each antenna of each MIMO combination is orthogonal to each other. The antennas shown in FIGS. 26-27 may also be divided into groups of three to form separate MIMO antennas. In one embodiment, antennas 68, 72, and 76 form one MIMO antenna and antennas 70, 74, and 78 form another MIMO antenna. More than three antennas may form a MIMO antenna. Each antenna used to form a MIMO antenna may have at least one of transmit and receive, transmit only, and receive only mode of operation.

Referring again to FIG. 25, in a situation where each antenna has at least two antenna elements capable of operating as a MIMO antenna, each antenna 70, 72, and 76 may separately operate as a MIMO antenna and interface with separate radios.

With respect to shields, as mentioned above, a shield may reduce coupling and/or near-field interference between antennas in substantial close proximity, shield the antennas from noise generated by system electronics, and shape the coverage area of each of the antennas. Antennas may be considered to be in substantial close proximity to each other when, referring to FIG. 4, distance 64 between the antennas is less than about two times the length of the frequency used by the antennas. Use of a shield to reduce interference between antennas improves antenna performance and may reduce the distance required between antennas for a desired level of performance. The shape of some shields may be better adapted to reduce near-field interference and/or coupling between antennas in substantial close proximity. For example, referring to FIG. 1, antennas 14, 16, and 18 are positioned linearly with little shield isolation between the antennas. The shield shape when combined with the antenna placement may be less able to block near-field interference between antennas. The shape of shield 12 with antennas positioned at the vertices may be best adapted to shape the coverage areas, but be less effective at reducing near-field interference and/or coupling between antennas.

Figure 4:
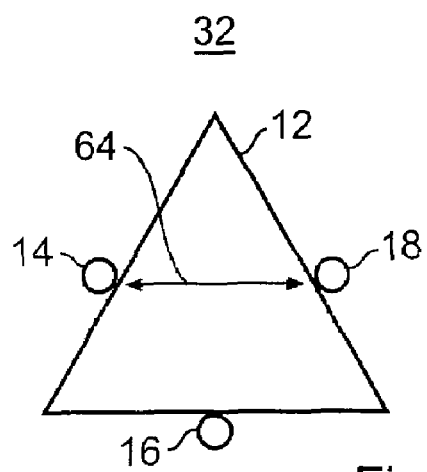
FIG. 4 is a diagram of a top view of a triangular antenna module with alternate antenna positions in accordance with one embodiment of the present invention.

Referring to FIG. 1, near-field interference and/or coupling between the antennas of antenna module 10 may be reduced by spacing the antennas farther from each other; however, the distance required between the antennas to provide a substantial reduction in near-field interference and/or coupling may result in an antenna module, wherein the antennas are not in substantial close proximity to each other. Shield 12 is used to reduce near-field interference and/or coupling between antennas by modifying the antenna positions relative to the antenna. Referring to FIG. 4, positioning antennas 12, 14, and 16 on the sides of shield 12 places a substantial portion of the shield between the antennas. The shield between the antennas may block and/or reduce near-field interference and/or coupling between antennas, thereby reducing interference between antennas in substantial close proximity. Shields 36, 40, 44, 48, and 52 of FIGS. 6, 8, 11, 14, and 16 respectively reduce near-field interference and/or coupling between antennas in substantial close proximity because the shield provides a measure of isolation between the antennas.

The shape of the shield may modify the shape of the antenna coverage areas, as described above. A shield may be constructed of any material that attenuates near-field interference and/or coupling between antennas. Additionally, the thickness, height, and shape of the shield may be modified to further reduce near-field interference and/or coupling between antennas. A shield may have any material composition, for example, a shield may be solid, hollow, or substantially solid with cavities. Radios and/or system electronics may be placed and/or anchored in a shield hollow and/or cavity. Shields may be formed of any material or combination of materials suitable for the application.

Antenna performance may also be negatively impacted by detuning an antenna. Generally, antennas have a center frequency and a range around the center frequency at which they function efficiently. An antenna becomes detuned when its center frequency and the range around the center frequency shift to a higher or a lower frequency and/or when the center frequency remains unaffected, but the bandwidth around the center frequency decreases. Antennas may become detuned when placed in close proximity with materials that detune that type of antenna. For example, placing an omni-directional antenna close to metal may detune the antenna. Placing a mobile phone antenna close to the human body may detune the antenna. The detuning effect of a shield on an antenna may be reduced by, for example, designing an antenna that requires proximity to the shield to become tuned, forming the shield from a material that does not detune the antenna, and/or offsetting the antenna from the shield with an antenna spacer. In one embodiment, the antenna performance characteristics are selected such that when the antenna is used in close proximity to the shield, the antenna operates at the desired center frequency with the desired bandwidth, but when the antenna is used apart from the shield, it becomes detuned. In an exemplary embodiment, referring to FIG. 8, antennas 14, 16 and 18 are offset from the shield using antennas spacers 62. The size of the antenna spacer 62 and the amount of the offset may be selected to reduce the amount of detuning to a desire level.

As discussed above, a shield may also alter the shape of an antenna's coverage area. The shield may alter the shape of an antenna's area of coverage in any manner suitable for the environment or application. For example, in an exemplary embodiment, referring to FIGS. 1-3, antenna module 10 comprises three antennas 14, 16, and 18, and a substantially triangular shaped shield 12. Each antenna is positioned at a vertex of the shield 12. Antennas 14,16, and 18 may connect directly to shield 12 and/or to antenna spacers. When antennas 14, 16, and 18 are omni-directional antennas, shield 12 reduces each coverage area 20, 22, and 24 of antennas 14, 16, and 18 respectively to an area less than substantially spherical. The coverage areas 20, 22, and 24, referring to FIG. 3, may be representative of the shape of the resulting coverage areas in two dimensions. The coverage areas may overlap to form virtual sectors 26, 28, and 30.

Figure 5:
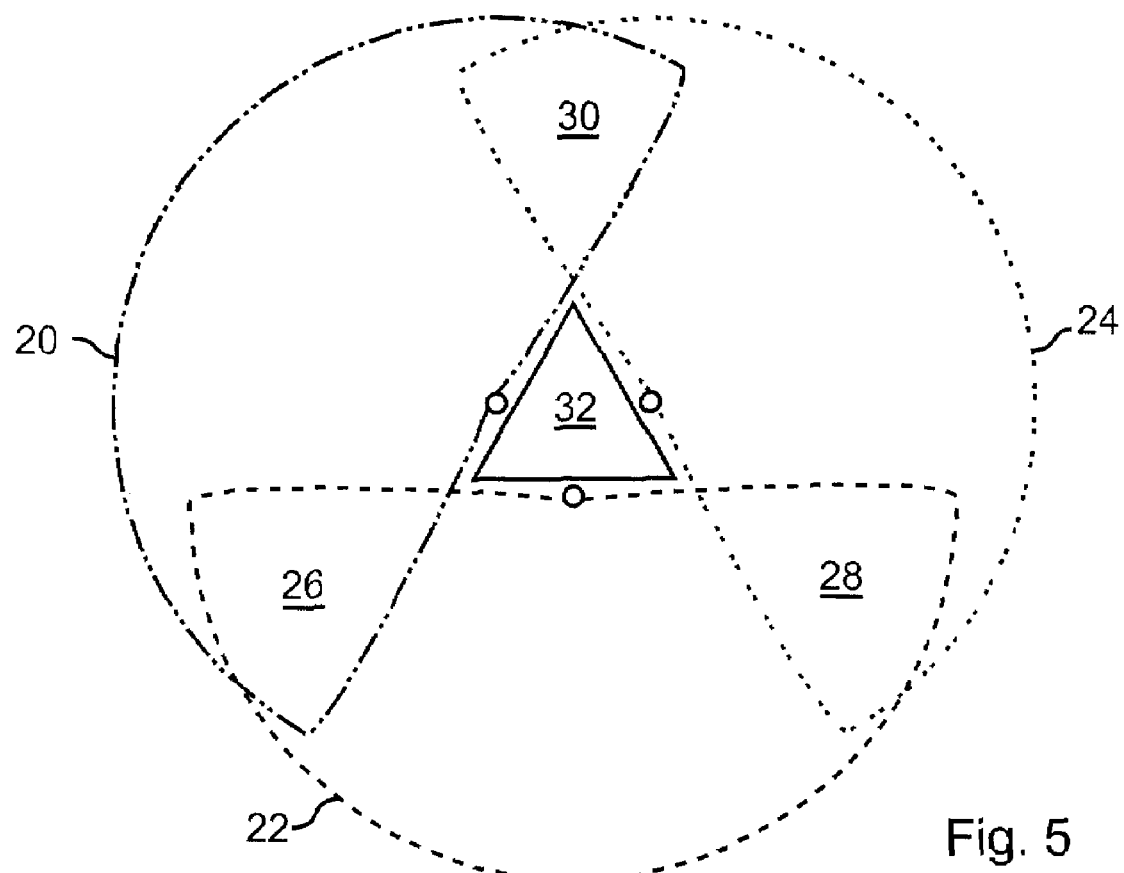
FIG. 5 is a diagram of a top view of coverage areas of an exemplary triangular antenna module with alternate antenna positions in accordance with one embodiment of the present invention.

In another embodiment, referring to FIG. 4, antenna module 32 comprises antennas 14, 16, and 18, and substantially triangular shaped shield 12. In this embodiment, each antenna is positioned along an edge of the shield 12. Antennas 14, 16, and 18 may be mounted directly to shield 12 and/or to antenna spacers. When antennas 14, 16, and 18 are omni-directional antennas, shield 12 reduces each coverage area 20, 22, and 24 of antennas 14, 16, and 18 respectively to an area less than substantially spherical. Referring to FIG. 5, the coverage areas 20, 22, and 24 may be representative of the shape of the resulting coverage areas in two dimensions. The coverage areas may overlap to form virtual sectors 26, 28, and 30.

Figure 6:
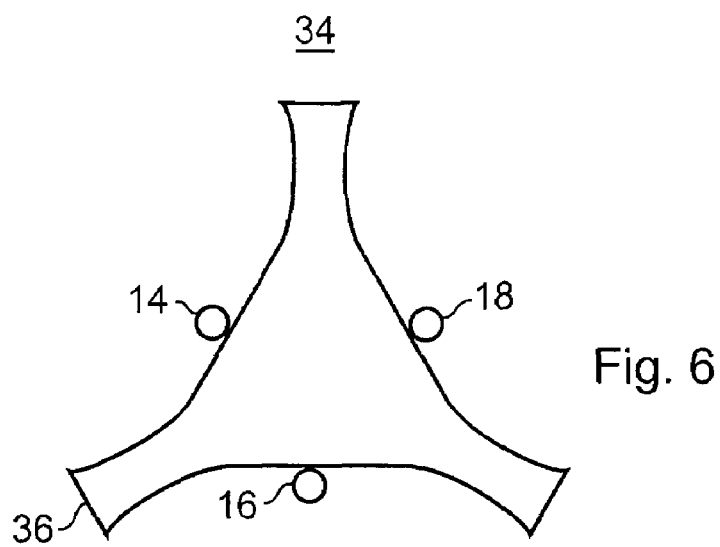
FIG. 6 is a diagram of a top view of an extended triangular antenna module in accordance with one embodiment of the present invention.
Figure 7:
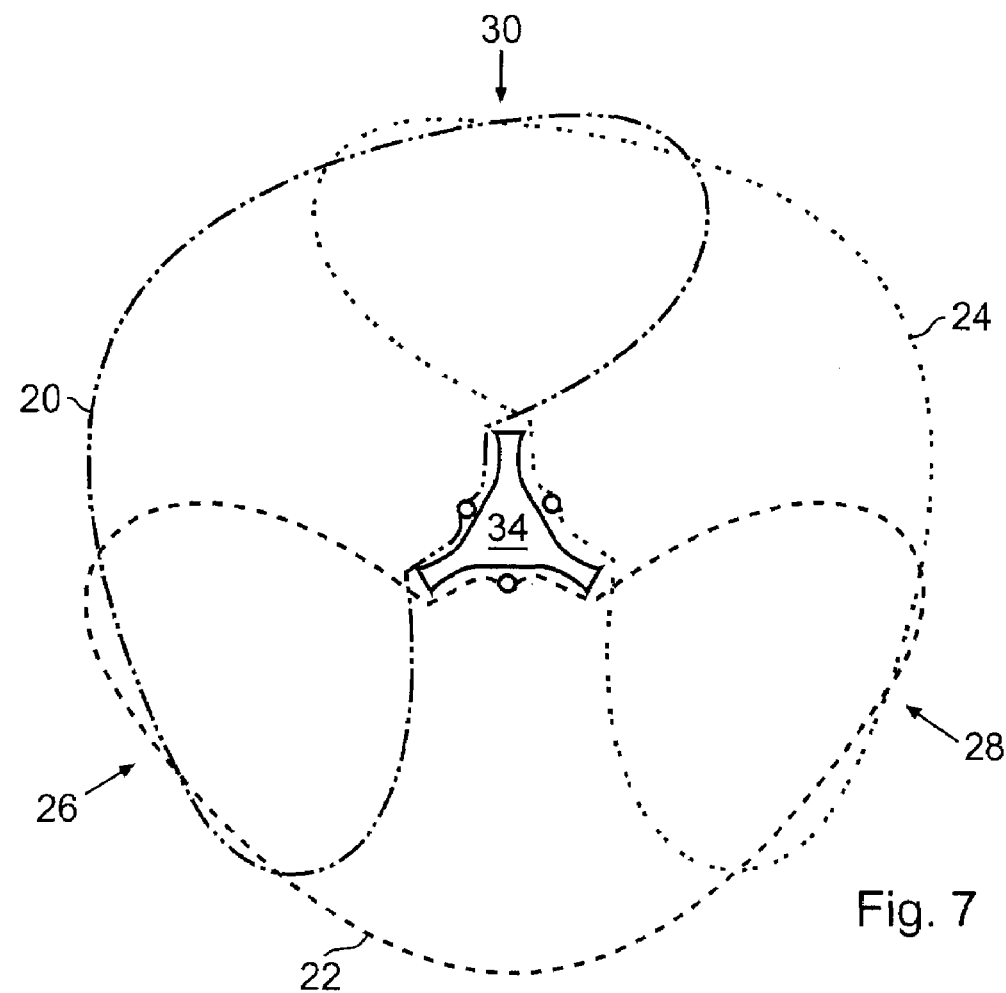
FIG. 7 is a diagram of a top view of coverage areas of an extended triangular antenna module in accordance with one embodiment of the present invention.

In another embodiment, referring to FIG. 6, antenna module 34 comprises antennas 14, 16, and 18, and shield 36. The shape of shield 36 is substantially triangular with the vertices extended and enlarged. Each antenna 14, 16, and 18 is positioned along an edge of the shield 36. Antennas 14, 16, and 18 may be mounted directly to shield 36 and/or to antenna spacers. When antennas 14, 16, and 18 are omni-directional antennas, shield 36 reduces each coverage area 20, 22, and 24 of antennas 14, 16, and 18, respectively, to an area less than substantially spherical. The coverage areas 20, 22, and 24, referring to FIG. 7, may be representative of the shape of the resulting coverage areas in two dimensions. The coverage areas may overlap to form virtual sectors 26, 28, and 30.

Figure 8:
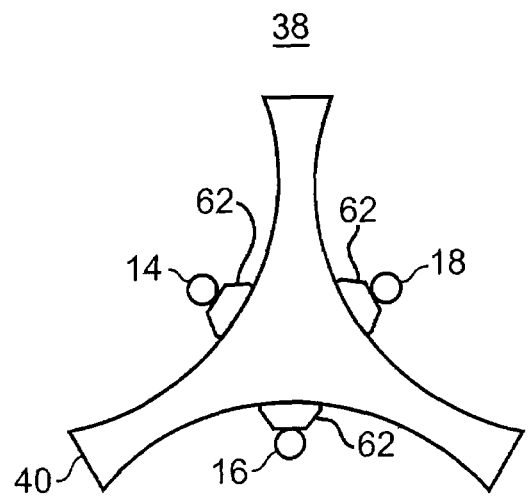
FIG. 8 is a diagram of a top view of a parabolic antenna module with antenna spacers in accordance with one embodiment of the present invention.
Figure 9:
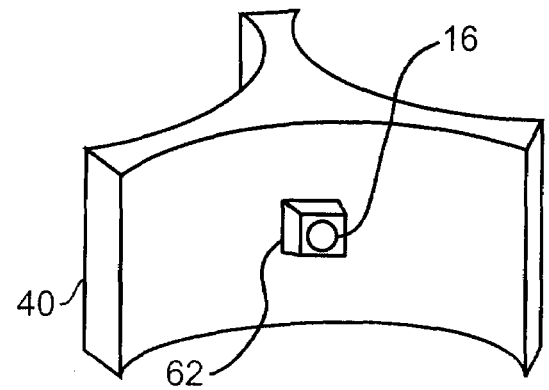
FIG. 9 is a diagram of a perspective view of a parabolic antenna module with antenna spacers in accordance with one embodiment of the present invention.
Figure 10:
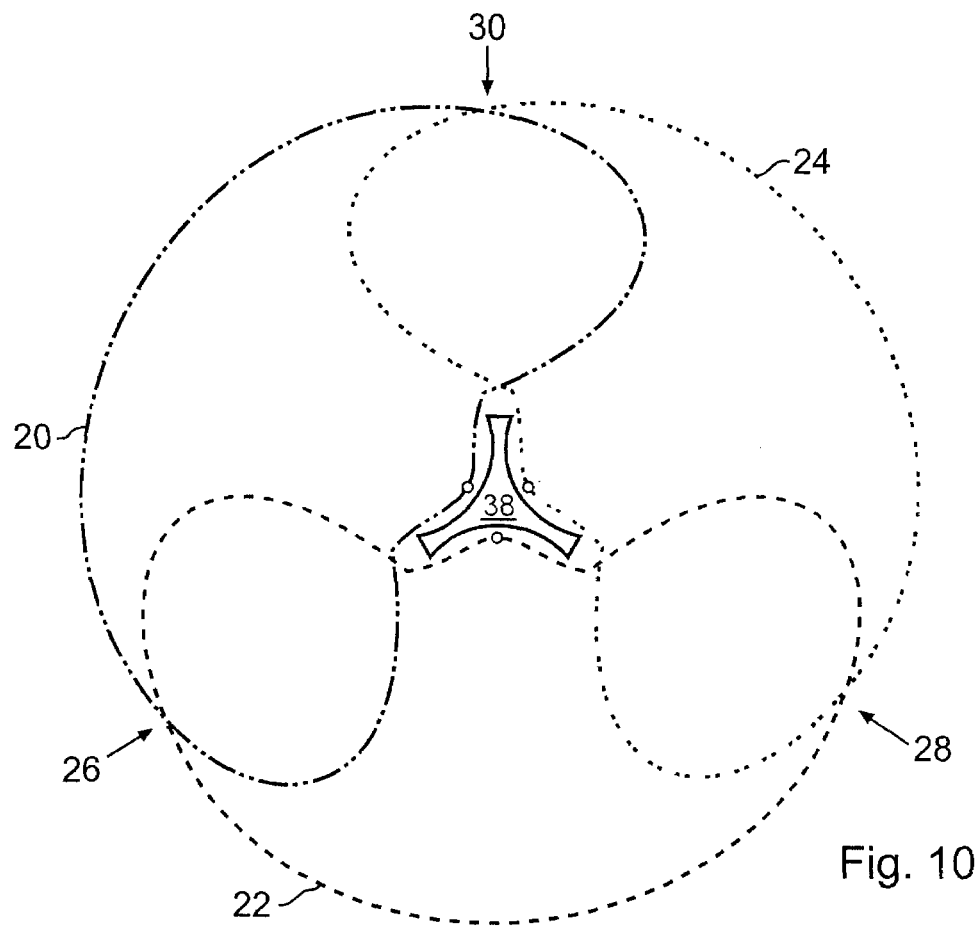
FIG. 10 is a diagram of a top view of coverage areas of a parabolic antenna module with antenna spacers in accordance with one embodiment of the present invention.

In another embodiment, referring to FIGS. 8-10, antenna module 38 comprises antennas 14, 16, and 18, and shield 40. The shape of shield 40 is substantially parabolic on the inner curves. The antennas 14, 16, and 18 are positioned in the parabolic curves of the shield 40. Antennas 14, 16, and 18 may be mounted to shield 40 using antenna spacer 62 and/or directly to shield 40. When antennas 14, 16, and 18 are omni-directional antennas, shield 40 reduces each coverage area 20, 22, and 24 of antennas 14, 16, and 18, respectively, to an area less than substantially spherical. Referring to FIG. 10, the coverage areas 20, 22, and 24 may be representative of the shape of the resulting coverage areas in two dimensions. The shape of the parabolic inner curve of shield 40 and offset of the antenna spacer may determine whether coverage areas 20, 22, and 24 overlap to form virtual sectors. In one embodiment, the parabolic curves of shield 40 are sufficiently steep to substantially reduce overlap between the coverage areas. In another embodiment, the parabolic curves of shield 40 are sufficiently shallow that coverage areas 20, 22, and 24 overlap and form virtual sectors. The shape of the coverage areas may also be modified by adjusting the size of the antenna spacer.

Figure 11:
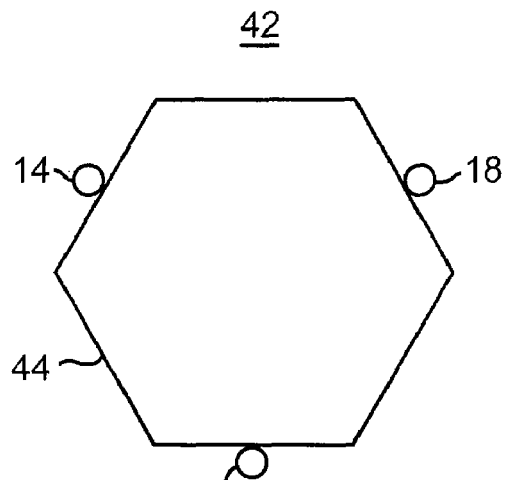
FIG. 11 is a diagram of a top view of a hexagonal antenna module in accordance with one embodiment of the present invention.
Figure 12:
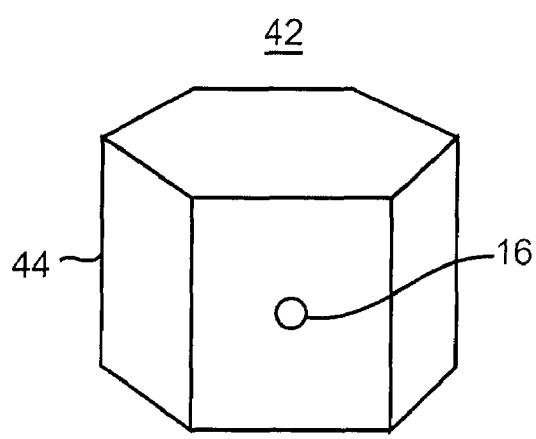
FIG. 12 is a diagram of a perspective view of a hexagonal antenna module in accordance with one embodiment of the present invention.
Figure 13:
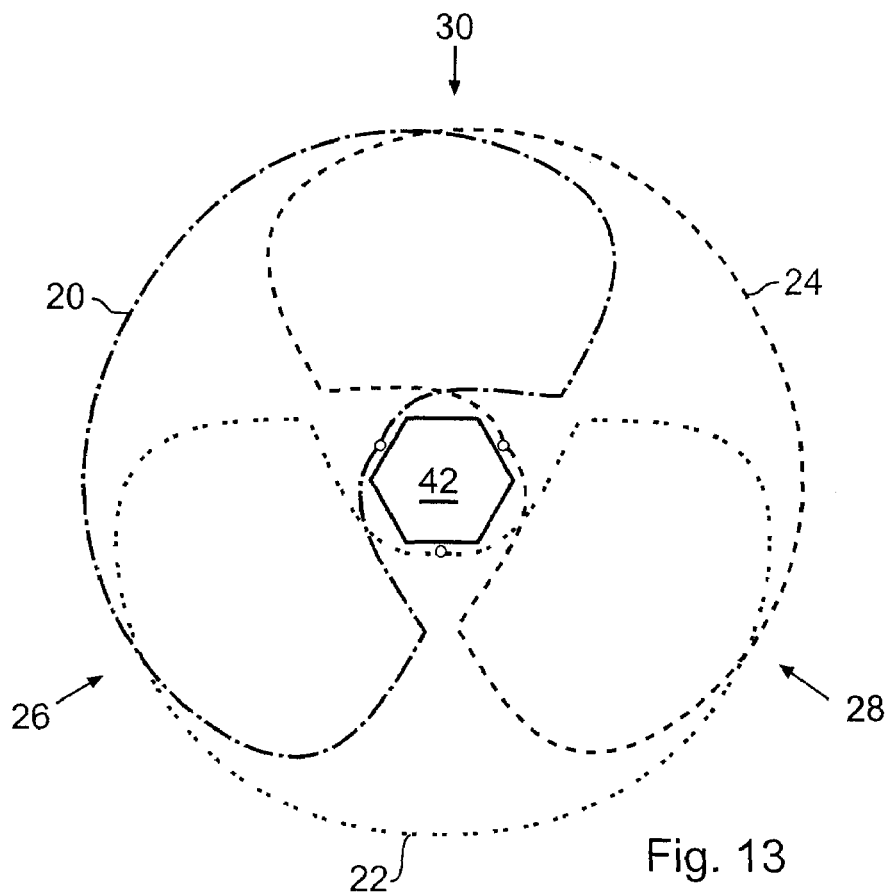
FIG. 13 is a diagram of a top view of coverage areas of a hexagonal antenna module in accordance with one embodiment of the present invention.

In another embodiment, referring to FIGS. 11-13, antenna module 42 comprises antennas 14, 16, and 18, and shield 44. The shape of shield 44 is substantially hexagonal. Each antenna 14, 16, and 18 is positioned substantially in the center of a non-adjacent face of the shield 44. Antennas 14, 16, and 18 may be mounted directly to shield 44 and/or to antenna spacers. When antennas 14, 16, and 18 are omni-directional antennas, shield 44 reduces each coverage area 20, 22, and 24 of antennas 14, 16, and 18 respectively to an area less than substantially spherical. The coverage areas 20, 22, and 24, referring to FIG. 13, may be representative of the shape of the resulting coverage areas in two dimensions. The coverage areas may overlap to form virtual sectors 26, 28, and 30.

Figure 14:
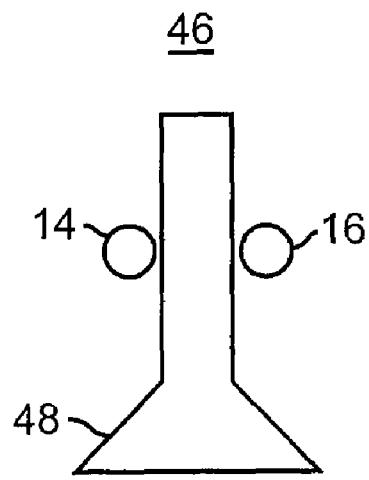
FIG. 14 is a diagram of a side view of a rectangular antenna module with bottom angled shield in accordance with one embodiment of the present invention.
Figure 15:
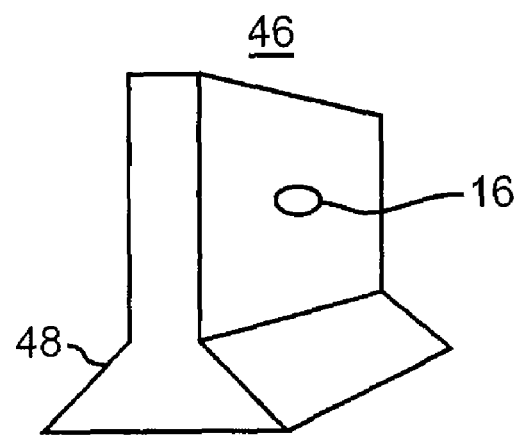
FIG. 15 is a diagram of a perspective view of a rectangular antenna module with bottom angled shield in accordance with one embodiment of the present invention.

In another embodiment, referring to FIGS. 14-15, antenna module 46 comprises antennas 14, and 16, and shield 48. The shape of shield 48 is substantially rectangular with an angled shield along the bottom. Each antenna 14, and 16 is positioned on a face of the shield 48. Antennas 14 and 16 may be mounted directly to shield 48 and/or to antenna spacers. When antennas 14 and 16 are omni-directional antennas, shield 48 reduces the coverage area of each antenna 14 and 16 to an area less than substantially spherical. The angled shield along the bottom additionally reduces the lower part of the coverage area and may reduce interference from system electronics and/or radios mounted below the antenna assembly. The invention contemplates any number of antennas that may be mounted to shield 48. In one embodiment, four antennas, two on each side, are mounted to shield 48. The angled shield along the bottom may also improve mechanical system stability.

Figure 16:
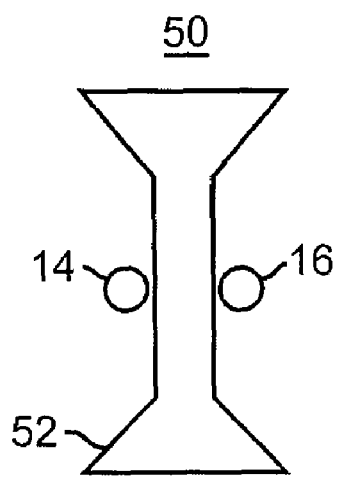
FIG. 16 is a diagram of a side view of a rectangular antenna module with top and bottom angled shield in accordance with one embodiment of the present invention.
Figure 17:
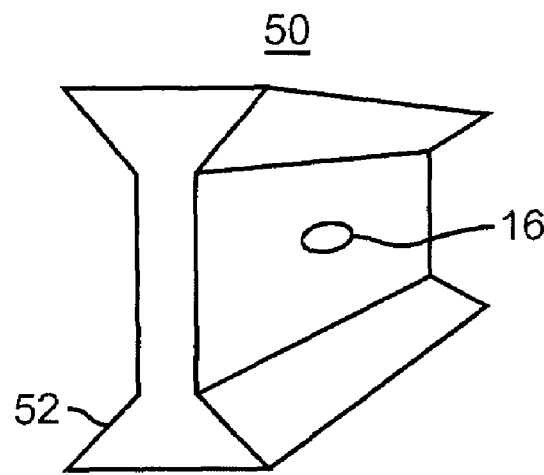
FIG. 17 is a diagram of a perspective view of a rectangular antenna module with top and bottom angled shield in accordance with one embodiment of the present invention.

In another embodiment, referring to FIGS. 16-17, antenna module 50 comprises antennas 14, and 16, and shield 52. The shape of shield 52 is substantially rectangular with an angled shield along the top and bottom. Each antenna 14, and 16 is positioned on a face of the shield 52. Antennas 14 and 16 may be mounted directly to shield 52 and/or to antennas spacers. When antennas 14 and 16 are omni-directional antennas, shield 52 reduces the coverage area of each antenna 14 and 16 to an area less than substantially spherical. The angled shields along the top and the bottom reduce the top and the bottom part of the coverage area respectively and may reduce interference from system electronics and/or radios positioned above and/or below antenna module 50. The invention contemplates any number of antennas that may be mounted to shield 52. In one embodiment, four antennas, two on each side, are mounted to shield 52. The angled top and bottom of shield 52 may be used in conjunction with shields having other shapes, for example, shields 12, 36, 40, and 44 of FIGS. 4, 6, 8, and 11 respectively.

In another embodiment, the antenna shield may be an integral part of the case used to enclose the radio and/or other system electronics.

With respect to antenna spacers, an antenna may be mounted directly to a shield or it may be offset from the shield. An antenna spacer may be used to offset an antenna and/or the active element of an antenna away from the shield. The antennas may be offset from the shield for any reason and to achieve any result such as, for example, to reduce detuning, to reduce near-field interference between antennas, to reduce coupling between antennas, to achieve a desired distance between antennas, and/or to adjust antenna coverage area. In one embodiment, referring to FIG. 4, antennas 14, 16, and 18, are mounted directly to the shield 12. In other embodiments, referring to FIGS. 8 and 22, antennas 14, 16, and 18, are mounted to an antenna spacer 62 and the antenna spacer 62 is mounted to the shield.

Figure 22:
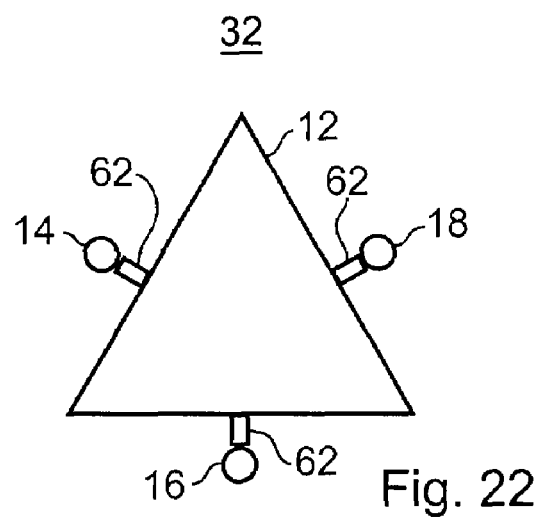
FIG. 22 is a diagram of a top view of a triangular antenna module with antenna spacers in accordance with one embodiment of the present invention.
Figure 23:
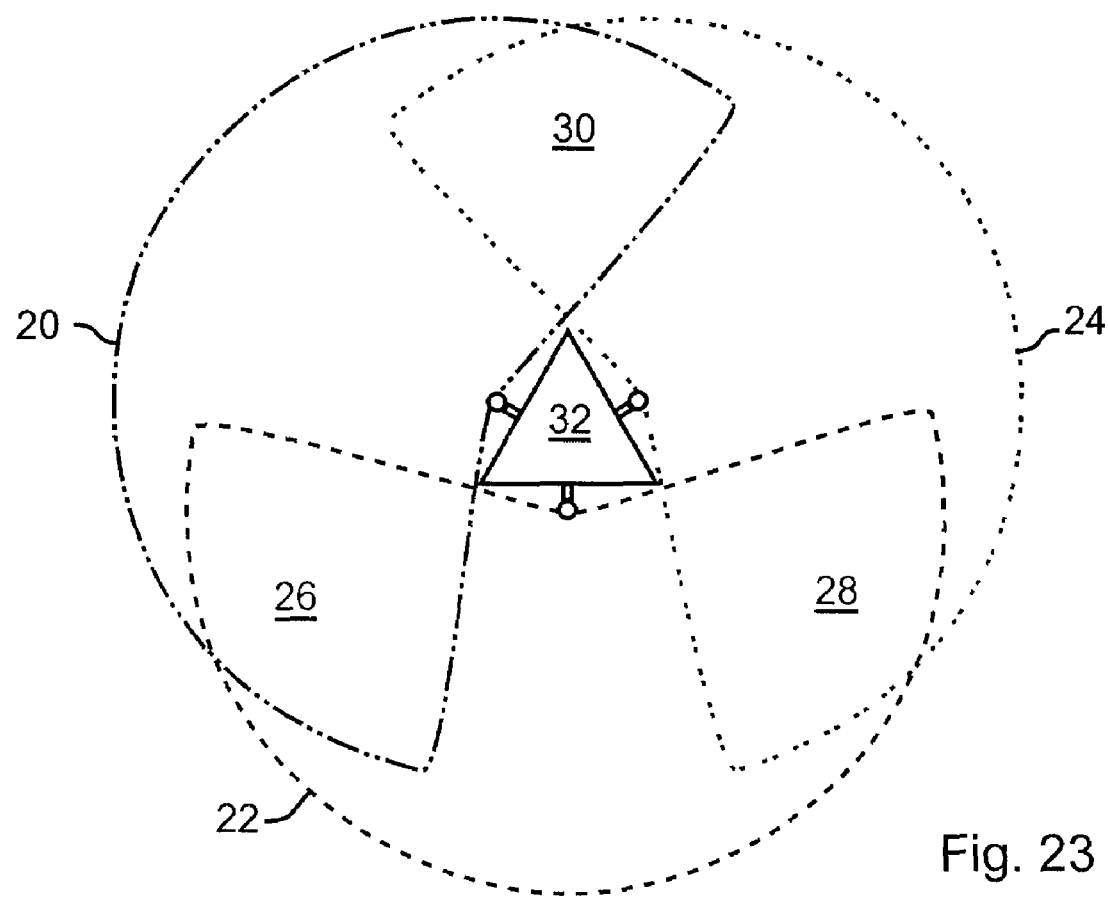
FIG. 23 is a diagram of a top view of coverage areas of a triangular antenna module with antenna spacers in accordance with one embodiment of the present invention.

The antenna spacer 62 may be formed of any material, have any shape, and be of any size. In one embodiment, referring to FIG. 22, the antenna spacer 62 material is selected to have a minimal detuning effect on antennas 14, 16, and 18. The size of antenna spacer 62 is selected to position antennas 14, 16, and 18 at a sufficient distance to decrease the detuning effect the material of shield 40 may have on antennas 14, 16, and 18. Antenna spacer 62 may also be used to increase the distance between antennas 14, 16 and 18 to reduce the effects of near-field interference and/or coupling between antennas. In one embodiment, the size of antenna spacer 62 is adjusted to position each antenna away from any other antenna a distance of about 1.25 times the wavelength of the frequency used by the antennas. The size of antennas spacer 62 may also be adjusted to alter the shape of the antenna coverage area and/or virtual sector size. In one embodiment, referring to FIGS. 4-5, the shape of coverage areas 20, 22, 24 and virtual sectors 26, 28, 30 may be represented by FIG. 5 when antennas 14, 16, 18 are mounted directly to shield 12. In another embodiment, referring to FIGS. 22-23, the addition of antenna spacers 62 to offset antennas 14, 16, and 18 from shield 12 increases each antenna coverage area 20, 22, 24 and the size of virtual sectors 26, 28, and 30. Antenna spacers 62 may be formed of any material, for example, metal, plastic, resin, wood, paper, foam, and any other suitable material. Referring to FIG. 22, antenna spacer 62 may connect to shield 40 in any suitable manner. Antennas 14, 16, and 18, may connect to antenna spacer 62 in any suitable manner. Antenna spacers 62 may have any material structure, for example, hollow, solid, a honeycomb structure, and any other material structure suitable for the application and environment. Antennas having multiple antenna elements may use a separate antenna spacer 62 for each antenna element. Antenna spacer 62 may be used with any antenna type or shield shape.

With respect to antenna covers, an individual antenna and/or antenna module may be positioned relative to each other and protected by an antenna cover. Referring to FIG. 18, a mounting base 56 may be used to mount and retain antenna cover 54 in position. Mounting base 56 may be of any material suitable for the application or environment. For example, mounting base 56 may be formed of metal, wood, plastic, foam, and any other suitable material. In an exemplary embodiment, the mounting base is made of plastic. The antenna cover 54 may be of any size or shape suitable for the application or environment. In an exemplary embodiment, the antenna cover 54 is substantially rectangular and made of plastic. In another embodiment, the antenna cover may be approximately a quarter of a sphere in shape. The antenna cover may be made of any material and/or be open at any part of the antenna cover 54. In an exemplary embodiment, antenna cover 54 is enclosed on all sides but one and is made of a plastic that does not interfere with antenna transmission and reception. Antennas inside the antenna cover 54 may be mounted to the antenna cover 54 and/or the mounting base 56.

Figure 19:
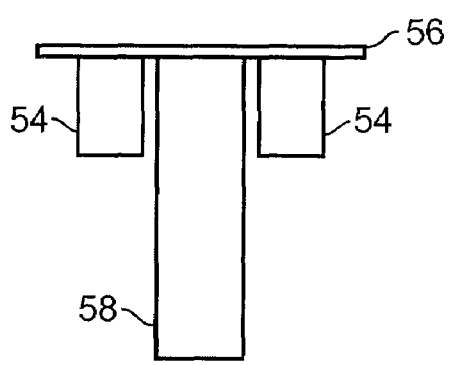
FIG. 19 is a diagram of a side view of antenna covers with mounting base in accordance with one embodiment of the present invention.
Figure 20:
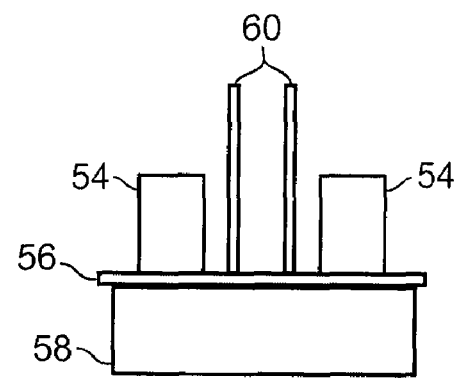
FIG. 20 is a diagram of a side view of an antenna covers with mounting base in an upright placement with shields in accordance with one embodiment of the present invention.
Figure 21:
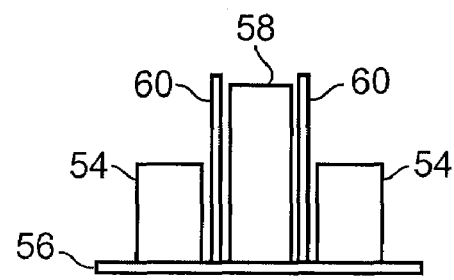
FIG. 21 is a diagram of a side view of an antenna covers with mounting base in an upright placement with a radio placed between with shields in accordance with one embodiment of the present invention.

The antenna cover 54 and the mounting base may form an antenna module suitable for use in a variety of situations. In an exemplary embodiment, referring to FIG. 19, antennas are mounted to mounting base 56 and covered by antenna covers 54. The resulting module is placed on top of a radio 58. In another embodiment, the antennas inside the antenna covers 54 are omni-directional and the radio 58 may be encased in metal and act as a shield between the antennas that shapes their coverage areas. In another embodiment, referring to FIG. 20, the antennas inside the antenna covers 54 are omni-directional and at least one shield 60 is mounted to the mounting base 56 between the antenna covers 54. Shield 60 shapes the coverage areas of the antennas inside antenna covers 54. The resulting module is placed on top of radio 58. The mounting base 56 may be made of material that reflects radio signals if shielding between the antennas and the radio is desirable. In another embodiment, referring to FIG. 21, the radio is placed in between two shields 60 positioned between antennas covers 54.

Any of the above components may be used to implement any of the methods discussed herein. Alteration of an antenna's coverage area may be accomplished in any manner; for example, the shape, size, and overlap of coverage areas may be modified by adjusting shield shape, shield size, antenna position, and antenna spacer size. A shield may have any shape to produce a desired coverage area pattern. Exemplary shield shapes are shown in FIGS. 1, 6, 8, 11, 15, 17, and 21. The coverage areas that may result are shown in FIGS. 3, 5, 7, 10, 13, and 23. The exemplary embodiments demonstrate that shield shape may modify antenna coverage areas and form virtual sectors. Shield shape is not limited to being symmetrical. For example, one side of a three sided shield may have a parabolic indentation, another side may be flat and a third side may be flat with top and bottom angled shields. Shield size may be consider an aspect if its shape. Just as the invention contemplates any shape of a shield, the size of a shield may be adjusted to achieve the desired shape of antenna coverage areas.

Antennas may be position at any location on a shield and at any location relative to another antenna to attain the desired coverage pattern. The effects of different antenna positions relative to a shield of substantially similar shape are illustrated by exemplary embodiments in FIGS. 1-3 and FIGS. 4-5. Moving antennas 14, 16, and 18 from the vertices of shield 12, as shown in FIG. 1, to the sides of shield 12, as shown in FIG. 4, results in reduced coverage areas. Coverage areas 20, 22, and 24 as shown in FIG. 3 are reduced in area to the coverage areas 20, 22, and 24 shown in FIG. 5 when antennas 14, 16, and 18 are moved from the vertices of shield 12 to the sides of shield 12. Referring to FIGS. 8 and 22, an antenna is mounted away from a shield using an antenna spacer 62 of any size. An antenna spacer 62 may connect to the shield at any angle and may be of any length, size, and shape. Modifying the size of the antenna spacer 62 and/or the resulting offset of the antennas from the shield may alter the area of coverage of the antenna which is connected to the antenna spacer. In one embodiment, referring to FIG. 4, mounting antennas 14, 16, and 18 to shield 12 with no or very short antenna spacers 62 may result in the coverage areas 20, 22, and 24 shown in FIG. 5. Adding antenna spacers 62 or increasing the length of the antenna spacers 62, referring to FIG. 22, increases coverage areas 20, 22, and 24 and the size of virtual sectors 26, 28 and 30.

Figure 31:
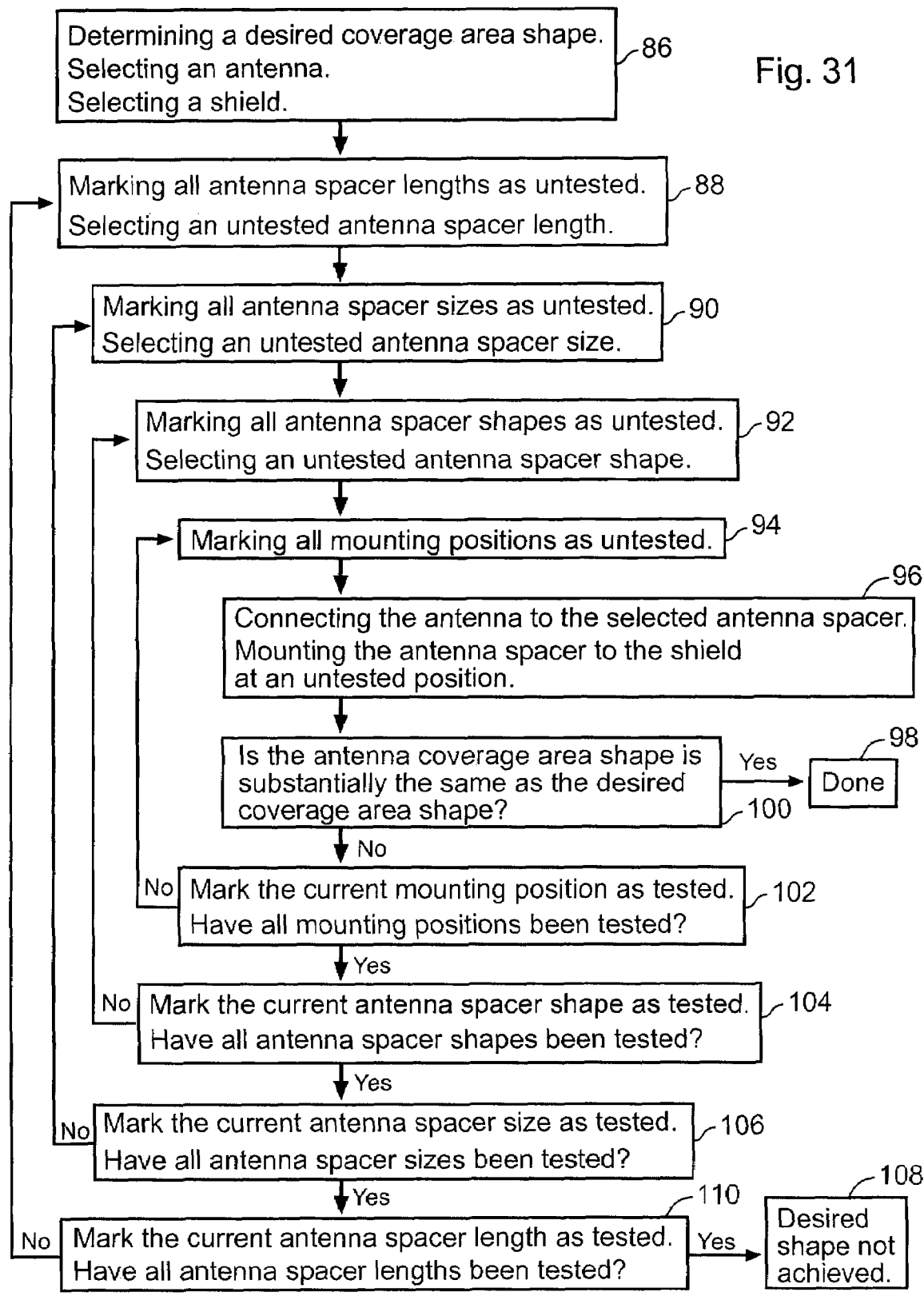
FIG. 31 is a flow diagram of a method for adjusting antenna coverage area shape in accordance with one embodiment of the present invention.

Referring to FIG. 31, an exemplary embodiment of a method for altering the shape of an antenna's coverage area includes selecting the desired coverage area shape, an antenna and a shield (step 86). An antenna spacer having a length, a size, and a shape is selected (steps 88-92). All possible mounting positions on the shield are marked as being untested (step 94). The antenna is connected to the antenna spacer and the antenna spacer is mounted to the shield at a position not previously tested (step 96). Once the antenna spacer is mounted, the shape of the antenna coverage area is compared to the desired coverage area shape (step 100). If the antenna coverage area shape is substantially the same as the desired coverage area shape, altering the shape of the antenna's coverage area is successful (step 98). If the antenna coverage area shape is not substantially the same as the desired coverage area shape, the method cycles through changing mounting positions (step 102), selecting antenna spacers of different shapes (step 104), selecting antenna spacers of different sizes (step 106), and selecting antenna spacers of different lengths (step 110). Once all available mounting positions, antenna spacer shapes, sizes, and lengths have been tried without achieving a substantial match between the antenna coverage area shape and the desired coverage area shape, the algorithm signals that the shape has not been achieved (step 108), and terminates.

Although the description above contains many details, these should not be construed as limiting the scope of the invention but as merely providing illustrations of some of the exemplary embodiments of this invention. The scope of the present invention fully encompasses other embodiments, and is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments are expressly incorporated by reference and are intended, unless otherwise specified, to be encompassed by the claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. No claim element is to be construed under the provisions of 35 U.S.C. 112, sixth paragraph, unless the element is expressly recited using the phrase "means for." The terms "comprises," "comprising," or any other variation, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An antenna module that provides a plurality of virtual sectors for servicing a wireless device, the antenna module comprising:
   a first antenna having a first coverage area;
   a second antenna having a second coverage area;
   a third antenna having a third coverage area; and
   a shield that shapes the first, the second, and the third coverage areas in such a way that a first portion of the first coverage area overlaps a first portion of the second coverage area thereby forming a first virtual sector;
   a first portion the third coverage area overlaps a second portion of the first coverage area thereby forming a second virtual sector;
   a second portion of the third coverage area overlaps a second portion of the second coverage area thereby forming a third virtual sector; wherein:
   at a majority of positions around the antenna module, at least two of the three antennas service the wireless device;
   the first and the second portion of any one coverage area do not overlap;
   within any one virtual sector, the wireless device can receive service from either of the two antennas that form the virtual sector;
   the first, second, and third antennas are assigned a first, a second, and a third channel respectively; and
   the first, the second, and the third channels are different from each other.

2. The antenna module of claim 1 wherein:
the shield comprises a substantially triangular shape; and
one antenna is coupled to each vertex.

3. The antenna module of claim 1 wherein:
the shield comprises a substantially triangular shape; and
one antenna is coupled to a different side respectively.

4. The antenna module of claim 1 wherein a distance between any two antennas reduces a near-field interference to below a threshold.

5. The antenna module of claim 1 further comprising a spacer coupled between any one antenna and the shield, wherein the spacer reduces a detuning of the antenna to below a threshold.

6. The antenna module of claim 1 wherein at least one of the antennas is coupled directly to the shield to reduce a detuning of the antenna to below a threshold.

7. The antenna module of claim 1 wherein a shape of the shield comprises substantially a least one of a triangle, a triangle with vertices extended and enlarged, a parabola, a hexagon, a rectangle, a rectangle with bottom angled shield, a rectangle with top and bottom angled shields, and a cube.

8. The antenna module of claim 1 wherein at least one of the antennas comprises a directional antenna.

9. The antenna module of claim 1 wherein at least one of the antennas comprises a MIMO antenna.

10. The antenna module of claim 9 wherein:
the MIMO antenna comprises a first and a second antenna element;
the first element is transmit only;
the second element is receive only; and
the first and the second antenna element are assigned a same channel.

11. The antenna module of claim 1 wherein the first, second, and third channels comprise minimally interfering channels provided by at least one of an IEEE 802.11, a Bluetooth, a ultra-wideband, an IEEE 802.15, and an IEEE 802.16 communication protocol.

12. An antenna module that provides a plurality of virtual sectors for servicing a wireless device, the antenna module comprising:
   a first antenna having a first coverage area;
   a second antenna having a second coverage area;
   a third antenna having a third coverage area; and
   a shield that shapes the first, the second, and the third coverage areas into three virtual sectors, wherein:
   each one virtual sector is adjacent to the other two virtual sectors;
   no virtual sector substantially overlaps any other virtual sector;
   at a majority of positions around the antenna module, at least two of the three antennas service the wireless device;
   the first, second, and third antennas are assigned a first, a second, and a third channel respectively; and
   the first, the second, and the third channels are different from each other.

13. The antenna module of claim 12 wherein:
the shield comprises a substantially triangular shape; and
one antenna is coupled to each vertex.

14. The antenna module of claim 12 wherein:
the shield comprises a substantially triangular shape; and
one antenna is coupled to a different side respectively.

15. The antenna module of claim 12 wherein a distance between any two antennas reduces a near-field interference to below a threshold.

16. The antenna module of claim 12 further comprising a spacer coupled between any one antenna and the shield, wherein the spacer reduces a detuning of the antenna to below a threshold.

17. The antenna module of claim 12 wherein at least one of the antennas is coupled directly to the shield to reduce a detuning of the antenna to below a threshold.

18. The antenna module of claim 12 wherein a shape of the shield comprises substantially a least one of a triangle, a triangle with vertices extended and enlarged, a parabola, a hexagon, a rectangle, a rectangle with bottom angled shield, a rectangle with top and bottom angled shields, and a cube.

19. The antenna module of claim 12 wherein at least one of the antennas comprises a directional antenna.

20. The antenna module of claim 12 wherein at least one of the antennas comprises a MIMO antenna.

21. The antenna module of claim 20 wherein:
the MIMO antenna comprises a first and a second antenna element;
the first element is transmit only;
the second element is receive only; and
the first and the second antenna element are assigned the same channel.

22. The antenna module of claim 12 wherein the first, second, and third channels comprise minimally interfering channels provided by at least one of an IEEE 802.11, a Bluetooth, a ultra-wideband, an IEEE 802.15, and an IEEE 802.16 communication protocol.

23. A method performed by an assembler for assembling an antenna module having a virtual sector, the antenna module comprising a first antenna having a first coverage area, a second antenna having a second coverage area, and a shield, the method comprising:
coupling the first antenna to the shield, wherein the shield shapes the first coverage area;
coupling the second antenna to the shield, wherein the shield shapes the second coverage area in such a manner that a portion of the second coverage area overlaps a portion of the first coverage area thereby forming a virtual sector;
assigning a first channel and a second channel to the first antenna and the second antenna respectively, wherein the first channel and the second channel are different;
servicing at least two wireless devices simultaneously device at any position within the virtual sector using the first and the second antenna.

24. The method of claim 23 wherein coupling the first antenna comprises coupling a spacer between the first antenna and the shield.

25. The method of claim 23 wherein servicing comprises communicating with the wireless device using the first and the second antenna.

26. The method of claim 23 wherein coupling comprises adjusting a position of at least one of the first and the second antenna relative to the shield.

27. The method of claim 23 wherein:
coupling comprises adjusting a length of a spacer; and
the spacer is positioned between the first antenna or the second antenna and the shield.

28. The method of claim 27 wherein adjusting comprises selecting a shield having a different shape.

* * * * *